United States Patent
Vanderwees et al.

(10) Patent No.: US 10,180,289 B2
(45) Date of Patent: Jan. 15, 2019

(54) FLOW BALANCED HEAT EXCHANGER FOR BATTERY THERMAL MANAGEMENT

(71) Applicant: DANA CANADA CORPORATION, Oakville (CA)

(72) Inventors: Doug Vanderwees, Mississauga (CA); Michael A. Martin, Hamilton (CA)

(73) Assignee: Dana Canada Corporation, Oakville, Ontario (CA)

( * ) Notice: Subject to any disclaimer, the term of this patent is extended or adjusted under 35 U.S.C. 154(b) by 395 days.

(21) Appl. No.: 15/330,059

(22) PCT Filed: Jan. 30, 2015

(86) PCT No.: PCT/CA2015/050070
§ 371 (c)(1),
(2) Date: Jul. 29, 2016

(87) PCT Pub. No.: WO2015/113161
PCT Pub. Date: Aug. 6, 2015

(65) Prior Publication Data
US 2017/0051987 A1    Feb. 23, 2017

Related U.S. Application Data

(60) Provisional application No. 61/933,547, filed on Jan. 30, 2014.

(51) Int. Cl.
*F28F 3/12*    (2006.01)
*F28F 9/02*    (2006.01)
(Continued)

(52) U.S. Cl.
CPC ............... *F28F 3/12* (2013.01); *F28F 9/02* (2013.01); *F28F 9/26* (2013.01); *F28F 13/08* (2013.01);
(Continued)

(58) Field of Classification Search
CPC ...... F28F 3/12; F28F 13/08; F28F 9/26; F28F 9/02; F28F 2275/04; F28F 2255/02;
(Continued)

(56) References Cited

U.S. PATENT DOCUMENTS 3,814,172 A    6/1974 Shore
4,093,024 A    6/1978 Middleton
(Continued)

FOREIGN PATENT DOCUMENTS

CN    101443621 A    5/2009
CN    103443953 A    12/2013

OTHER PUBLICATIONS

Canadian Intellectual Property Office; International Search Report and Written Opinion of PCT/CA2015/050070; dated Apr. 27, 2015, 8 pages, Canadian Intellectual Property Office, Gatineau, Quebec, Canada.

(Continued)

*Primary Examiner* — Ljiljana Ciric
(74) *Attorney, Agent, or Firm* — Marshall & Melhorn, LLC

(57) ABSTRACT

A heat exchanger for cooling batteries in hybrid or electric vehicles includes a plurality of spaced apart, discrete heat exchanger panels, each having a coolant inlet manifold section, a coolant outlet manifold section, and a plurality of coolant flow passages extending between the inlet and outlet manifold sections. The inlet and outlet manifold sections of the discrete panels are connected by tubes to define continuous coolant inlet and outlet manifolds, each having a coolant opening. The flow of coolant through discrete panels may be balanced by providing the fluid flow passages of the panels with various cross-sectional areas and/or hydraulic diameters, depending partly on the proximity of each panel to the coolant opening. In an embodiment, where the panels (Continued)

are formed from pairs of stamped plates, variation of the cross-sectional area and/or hydraulic diameter of the coolant flow passages may be achieved by deliberately offsetting the plates during assembly.

24 Claims, 10 Drawing Sheets

(51) Int. Cl.
  *F28F 9/26* (2006.01)
  *H01M 10/6556* (2014.01)
  *H01M 10/625* (2014.01)
  *H01M 10/6555* (2014.01)
  *F28F 13/08* (2006.01)
  *F28D 21/00* (2006.01)

(52) U.S. Cl.
  CPC ..... *H01M 10/625* (2015.04); *H01M 10/6555* (2015.04); *H01M 10/6556* (2015.04); *F28D 2021/0043* (2013.01); *F28F 2255/02* (2013.01); *F28F 2275/04* (2013.01); *H01M 2220/20* (2013.01)

(58) Field of Classification Search
  CPC ...... F28D 2021/0043; H01M 10/6555; H01M 10/6556; H01M 2220/20
  USPC .................................................. 165/143, 144
  See application file for complete search history.

(56) References Cited

U.S. PATENT DOCUMENTS

| | | | |
|---|---|---|---|
| 4,098,331 A | 7/1978 | Ford et al. | |
| 4,407,269 A | 10/1983 | Hopper | |
| 5,423,376 A | 6/1995 | Julien et al. | |
| 6,756,149 B2 | 6/2004 | Knights et al. | |
| 6,780,536 B2 | 8/2004 | Debe et al. | |
| 6,783,884 B2 | 8/2004 | Gibb et al. | |
| 6,924,052 B2 | 8/2005 | Lee | |
| 7,378,167 B2 | 5/2008 | Mizuno | |
| 8,211,584 B2 | 7/2012 | Jeon et al. | |
| 8,617,755 B2 | 12/2013 | Baschek et al. | |
| 2005/0263273 A1* | 12/2005 | Crumly | C25D 5/022 165/170 |
| 2008/0105420 A1 | 5/2008 | Taras et al. | |
| 2010/0314085 A1* | 12/2010 | Daly | F03B 13/00 165/168 |
| 2011/0030932 A1* | 2/2011 | Tucker | B21D 53/08 165/151 |
| 2011/0048687 A1 | 3/2011 | Des Champs | |
| 2011/0168370 A1* | 7/2011 | Garret | F28D 7/1684 165/158 |
| 2012/0237805 A1 | 9/2012 | Abels et al. | |
| 2012/0295178 A1 | 11/2012 | Farrington et al. | |
| 2015/0198372 A1* | 7/2015 | Desikan | F28D 1/0366 165/151 |
| 2016/0054075 A1* | 2/2016 | Taras | F28D 1/0391 165/173 |
| 2016/0204486 A1* | 7/2016 | Kenney | H01M 10/6556 429/120 |

OTHER PUBLICATIONS

Chinese Office Action of Application No. 201580006767.8, dated Aug. 2, 2017.

English Translation of Chinese Office Action of Application No. 201580006767.8, dated Aug. 2, 2017.

* cited by examiner

FLOW BALANCED HEAT EXCHANGER FOR BATTERY THERMAL MANAGEMENT

CROSS-REFERENCE TO RELATED APPLICATION

This application claims priority to and the benefit of U.S. Provisional Patent Application No. 61/933,547 filed Jan. 30, 2014, the contents of which are incorporated herein by reference.

FIELD OF THE INVENTION

The invention relates to a heat exchanger for battery thermal management, the heat exchanger comprising discrete panels with integrally formed manifold sections, wherein the manifold sections of the panels are joined by tubes, and enhancements are provided for ensuring balanced flow distribution through the panels, especially in sequences of panels fed by a common coolant supply channel.

BACKGROUND

Rechargeable batteries such as batteries made up of many lithium-ion cells can be used in many applications, including for example in electric vehicle ("EV") and hybrid electric vehicle ("HEV") applications. Such batteries can generate large amounts of heat that needs to be dissipated.

In a typical construction of such batteries, individual battery cells are sandwiched between heat exchanger panels having coolant circulation passages. The panels are connected to externally formed manifold structures which feed coolant to each of the heat exchanger panels, the connections between the panels and the manifold structures typically being mechanical connections sealed by gaskets or O-rings. The large number of mechanical joints in conventional battery construction can be problematic in terms of reliability and manufacturability of the heat exchanger.

There is a need for a simplified construction of heat exchangers for rechargeable batteries while improving manufacturability, reliability and efficiency of the heat exchanger.

SUMMARY

According to an embodiment, there is provided a heat exchanger, comprising: a plurality of discrete heat exchanger panels, each of the heat exchanger panels having an inlet manifold section, an outlet manifold section, and a plurality of fluid flow passages extending between the inlet and outlet manifolds; at least one inlet manifold tube, wherein each said inlet manifold tube connects the inlet manifold sections of an adjacent pair of said discrete heat exchanger panels, wherein an inlet manifold of the heat exchanger comprises the inlet manifold sections of the discrete heat exchanger panels and the at least one inlet manifold tube; at least one outlet manifold tube, wherein each said outlet manifold tube connects the outlet manifold sections of an adjacent pair of said discrete heat exchanger panels, wherein an outlet manifold of the heat exchanger comprises the outlet manifold sections of the discrete heat exchanger panels and the at least one outlet manifold tube; an inlet opening provided in said inlet manifold; and an outlet opening provided in said outlet manifold.

According to an embodiment, The heat exchanger according to claim 1, wherein each of the discrete heat exchanger panels comprises a pair of stamped plates, each having a plurality of open channels, wherein the plates are joined together face-to-face to define said inlet manifold section, said outlet manifold section, and said plurality of fluid flow passages.

According to an embodiment, wherein the stamped plates are identical.

According to an embodiment, the inlet and outlet manifold sections of the discrete heat exchanger panels are parallel to one another and each have a pair of open ends.

According to an embodiment, the fluid flow passages are substantially perpendicular to the inlet and outlet manifold sections.

According to an embodiment, the discrete heat exchanger panels each have a pair of flat, opposed faces which are traversed by said fluid flow passages.

According to an embodiment, the discrete heat exchanger panels each have a pair of opposed, axially-extending edge portions in which said inlet and outlet manifold sections are provided.

According to an embodiment, the discrete heat exchanger panels have a pair of opposed, transversely-extending edge portions.

According to an embodiment, the transversely-extending edge portions of adjacent pairs of said discrete heat exchanger panels are axially spaced apart.

According to an embodiment, the heat exchanger has a longitudinal axis, and wherein the inlet manifold and the outlet manifold are parallel to the longitudinal axis.

According to an embodiment, the inlet and outlet openings are provided at the same end of the heat exchanger.

According to an embodiment, the inlet and outlet openings are provided at opposite ends of the heat exchanger.

According to an embodiment, the at least one inlet manifold tube and the at least one outlet manifold tube are cylindrical.

According to an embodiment, the inlet and outlet manifold sections each have open ends, and wherein each of the open ends is cylindrical and is sized to receive one end of one of the tubes, wherein a sealed connection is provided between said open end and said one end of said tube.

According to an embodiment, the sealed connection is a brazed connection.

According to an embodiment, the at least one inlet manifold tube and the at least one outlet manifold tube each have a wall thickness which is greater than a thickness of material from which the panels are formed.

According to an embodiment, one or more flow restrictions are provided in at least a first heat exchanger panel of the plurality of discrete heat exchanger panels, said one or more flow restrictions producing a reduced cross-sectional area and/or hydraulic diameter in the first heat exchanger panel.

According to an embodiment, said one or more flow restrictions of the first heat exchanger panel are provided in at least some of the fluid flow passages, the inlet manifold section, and/or the outlet manifold section.

According to an embodiment, said one or more flow restrictions of the first heat exchanger panel are provided in the at least one inlet manifold tube and/or the at least one outlet manifold tube.

According to an embodiment, each said flow restriction is in the form of a depression.

According to an embodiment, each said depression is in the form of a crimp, a dimple, or a rib.

According to an embodiment, the number and/or size of the depressions is varied in different fluid flow passages of the first heat exchanger panel, so as to provide different flow restrictions in two or more of the fluid flow passages of the first heat exchanger panel.

According to an embodiment, a second heat exchanger panel of the plurality of discrete heat exchanger panels is adjacent to the first heat exchanger panel, wherein the first heat exchanger panel is proximal to at least one of the inlet opening and the outlet opening, and the second heat exchanger is distal to at least one of the inlet opening and the outlet opening.

According to an embodiment, the second heat exchanger panel is free of said flow restrictions.

According to an embodiment, the second heat exchanger panel is provided with one or more flow restrictions, and wherein the cross-sectional area and/or the hydraulic diameter in the second heat exchanger panel is greater than that in the first heat exchanger panel.

According to an embodiment, the plurality of discrete heat exchanger panels includes a first heat exchanger panel and a second heat exchanger panel; the first and second heat exchanger panels each comprise a pair of stamped plates, each having a plurality of open channels, wherein the plates are joined together face-to-face to define said inlet manifold section, said outlet manifold section, and said plurality of fluid flow passages; each of the stamped plates has a pair of opposed, axially-extending edge portions in which open channels are defined for said inlet and outlet manifold sections, a central portion in which open channels are defined for said fluid flow passages, and a pair of opposed, transversely-extending edge portions; wherein at least one of the transversely-extending edge portions and/or at least one of the axially extending edge portions of each of the stamped plates is provided with one or more indexing features which provide different degrees of axial alignment of the stamped plates in the first heat exchanger panel relative to the second heat exchanger panel; and wherein said different degrees of axial alignment provide the fluid flow passages of the second heat exchanger section with a greater cross-sectional area or hydraulic diameter than the fluid flow passages of the first heat exchanger section.

According to an embodiment, the indexing features are provided in each of the stamped plates and comprise at least a first set of indexing holes and a second set of indexing holes provided in the transversely-extending edge portions of the stamped plates; and alignment of the first set of said indexing holes in the first stamped plate with the first set of said indexing holes in the second stamped plate results in substantially complete axial alignment of the plates, such that there is substantially no offset of the open channels for the fluid flow passages in the first stamped plate relative to the open channels for the fluid flow passages in the second stamped plate; alignment of the second set of said indexing holes in the first stamped plate with the second set of said indexing holes in the second stamped plate results in axial misalignment of the plates, such that there is a partial offset of the open channels for the fluid flow passages in the first stamped plate relative to the open channels for the fluid flow passages in the second stamped plate.

According to an embodiment, the first and second stamped plates include a third set of said indexing holes, wherein: alignment of the third set of said indexing holes in the first stamped plate with the third set of said indexing holes in the second stamped plate results in axial misalignment of the plates, such that there is a partial offset of the open channels for the fluid flow passages in the first stamped plate relative to the open channels for the fluid flow passages in the second stamped plate; and wherein the partial offset produced by alignment of the third sets of indexing holes produces a partial offset which is different from the partial offset produced by alignment of the second sets of indexing holes.

According to an embodiment, each said set of indexing holes includes at least one indexing hole in each of the transversely-extending edge portions of each of the stamped plates.

According to an embodiment, the first and second stamped plates each have an axial axis of symmetry.

BRIEF DESCRIPTION OF THE DRAWINGS

The invention will now be described, by way of example only, with reference to the accompanying drawings in which.

DETAILED DESCRIPTION

Figure 1:
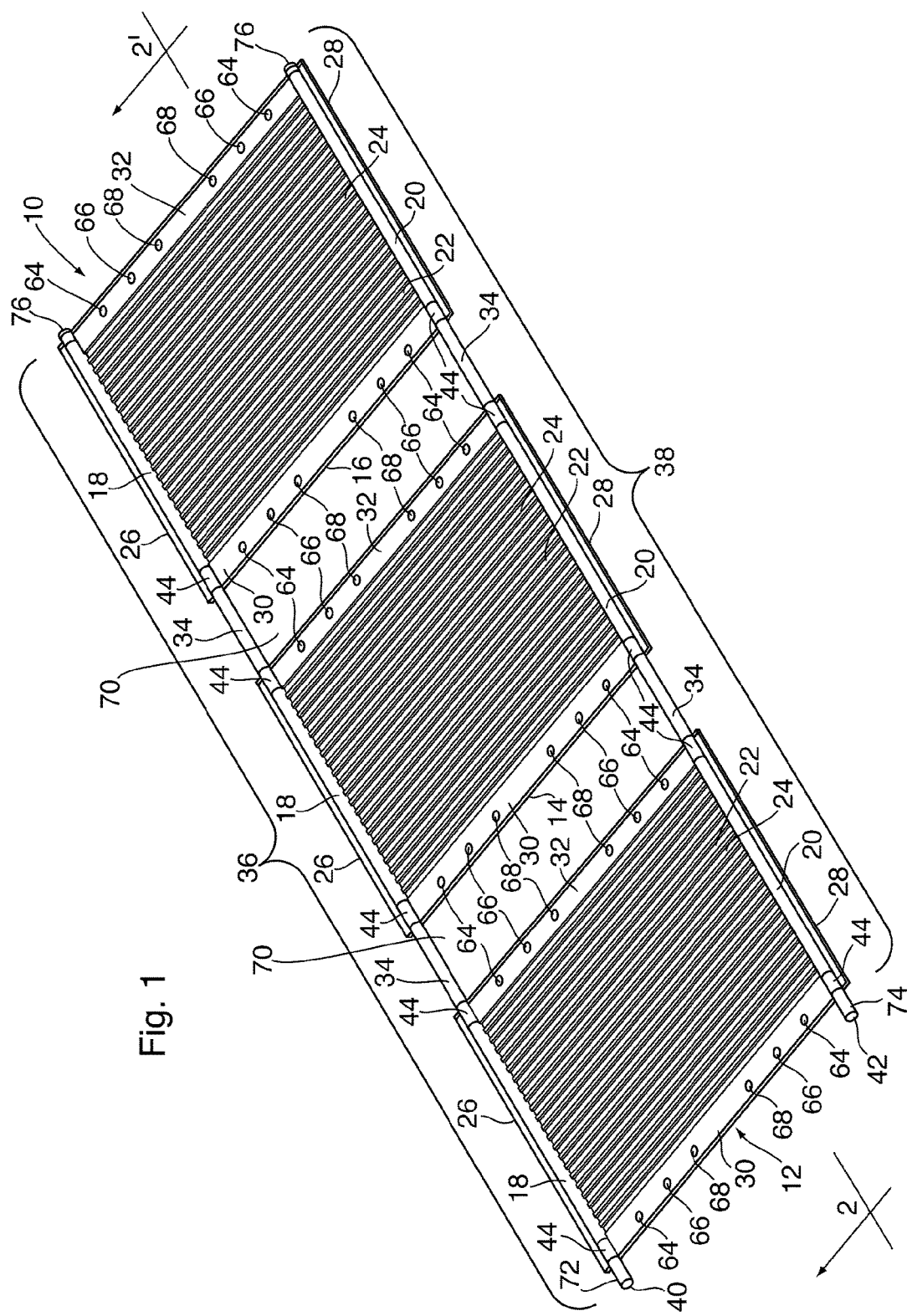
FIG. 1 is a perspective view of a heat exchanger according to an embodiment, in a flat state.
Figure 2:
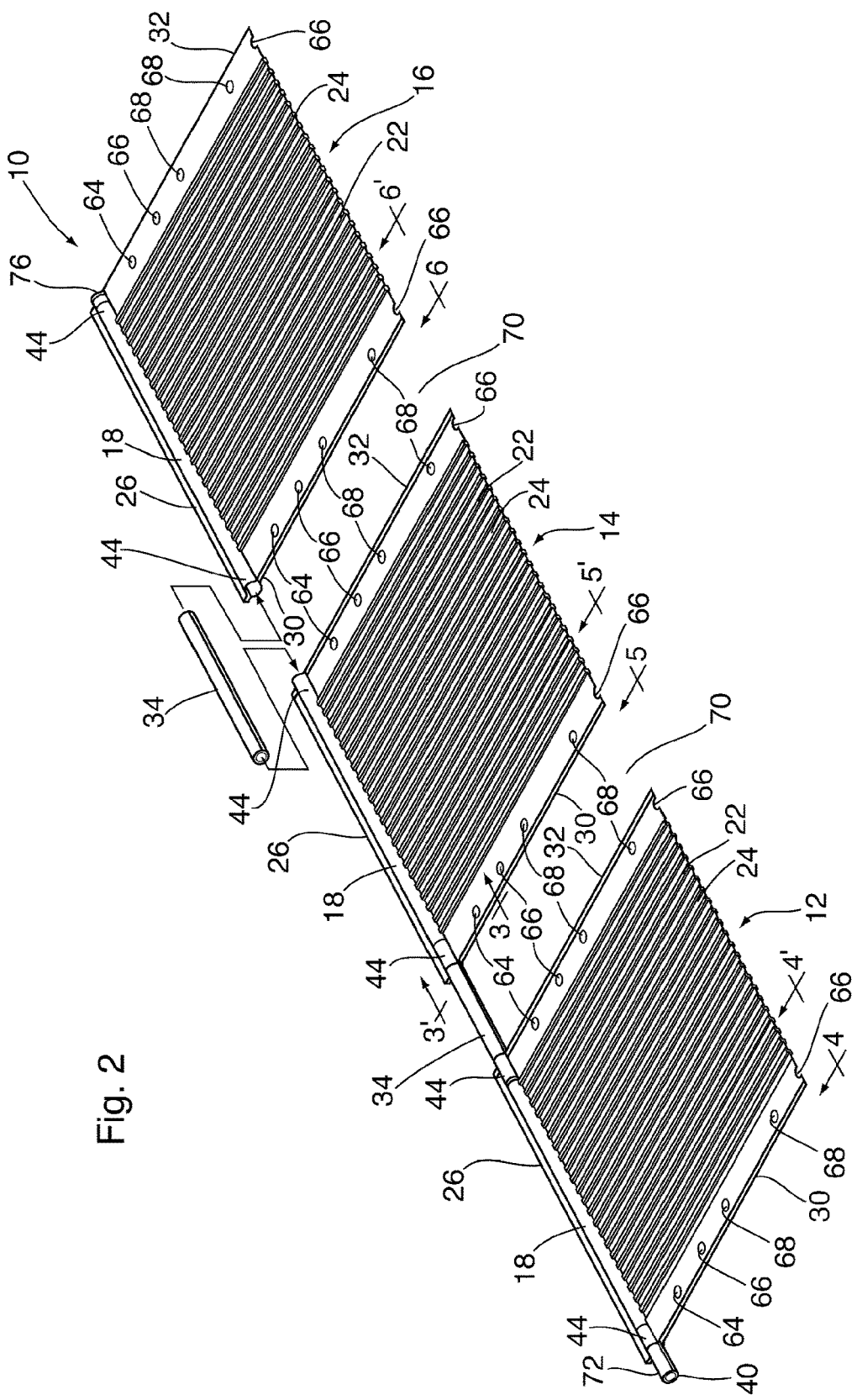
FIG. 2 is an axial (longitudinal) cross-section along line 2-2' of FIG. 1.

FIG. 1 illustrates a heat exchanger 10 according to a first embodiment. The heat exchanger 10 comprises three heat exchanger panels, labelled 12, 14 and 16. Although heat exchanger 10 is shown as having three panels, it will be appreciated that the heat exchanger 10 may comprise more than three panels or, alternatively, the heat exchanger 10 may include only two panels.

The heat exchanger panels 12, 14, 16 are discrete structures, meaning that they are separately formed. The formation of panels 12, 14, 16 as discrete structures simplifies the maintenance of acceptable dimensional tolerances during manufacturing, and makes it possible to use conventional tooling for heat exchanger manufacture.

The following description relates specifically to the first heat exchanger panel 12. However, except as otherwise noted in the following description, all three heat exchanger panels 12, 14, 16 are identical, and therefore the following description of the first heat exchanger panel 12 applies equally to the second and third heat exchanger panels 14, 16.

The first heat exchanger panel 12 includes integrally formed inlet and outlet manifold sections 18, 20 and a plurality of fluid flow passages 22 extending between the inlet and outlet manifold sections 18, 20. The inlet and outlet manifold sections 18, 20 each have a pair of open ends.

Figure 3:
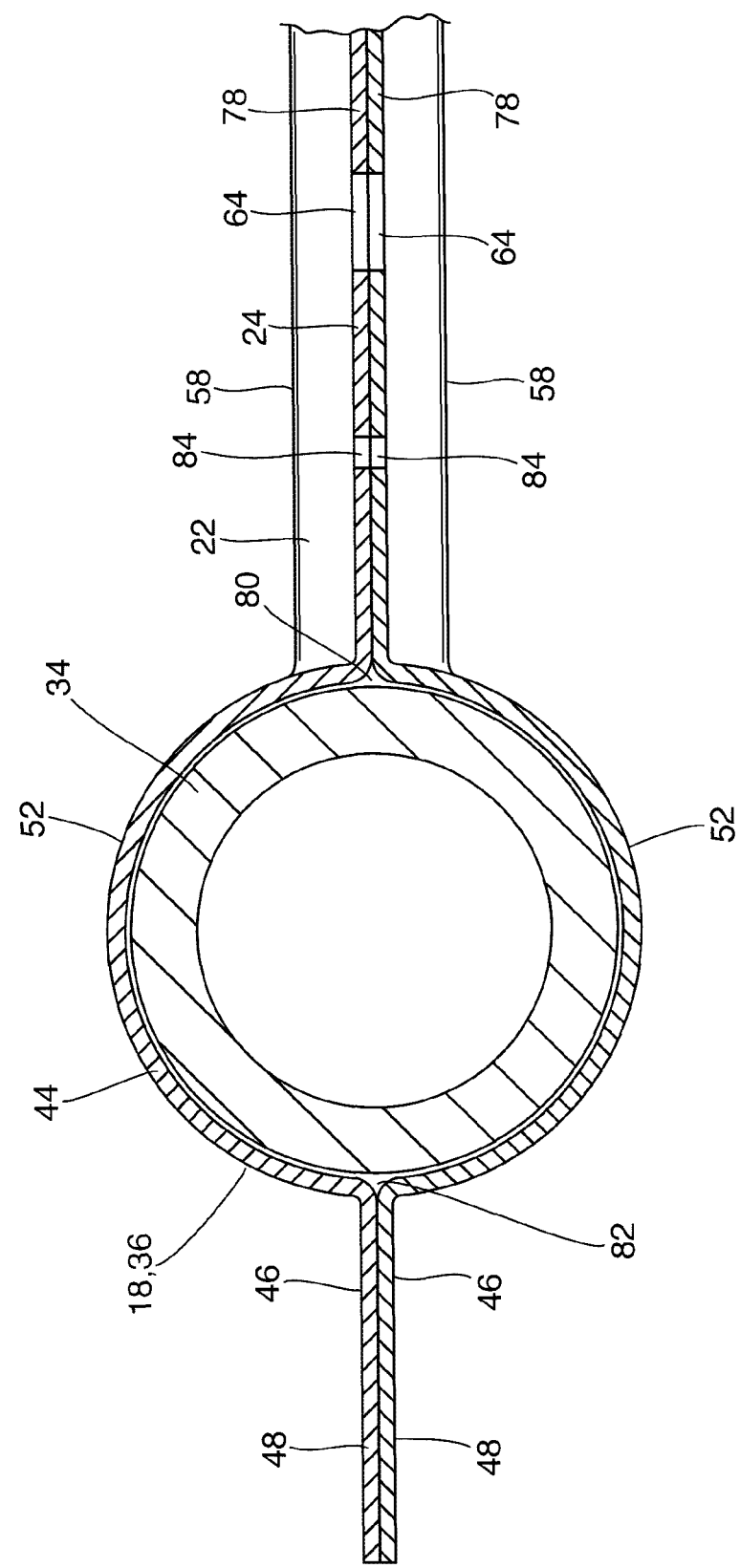
FIG. 3 is a transverse cross-section along line 3-3' of FIG. 2.

In the illustrated embodiment, the inlet and outlet manifold sections 18, 20 have a substantially circular cross-section, as shown in the transverse cross-section of FIG. 3. However, it will be appreciated that the cross-sections of the inlet and outlet manifold sections 18, 20 are not necessarily circular in all embodiments, and that the cross-sectional shapes of the inlet and outlet manifold sections 18, 20 may vary along their lengths.

Figure 4:
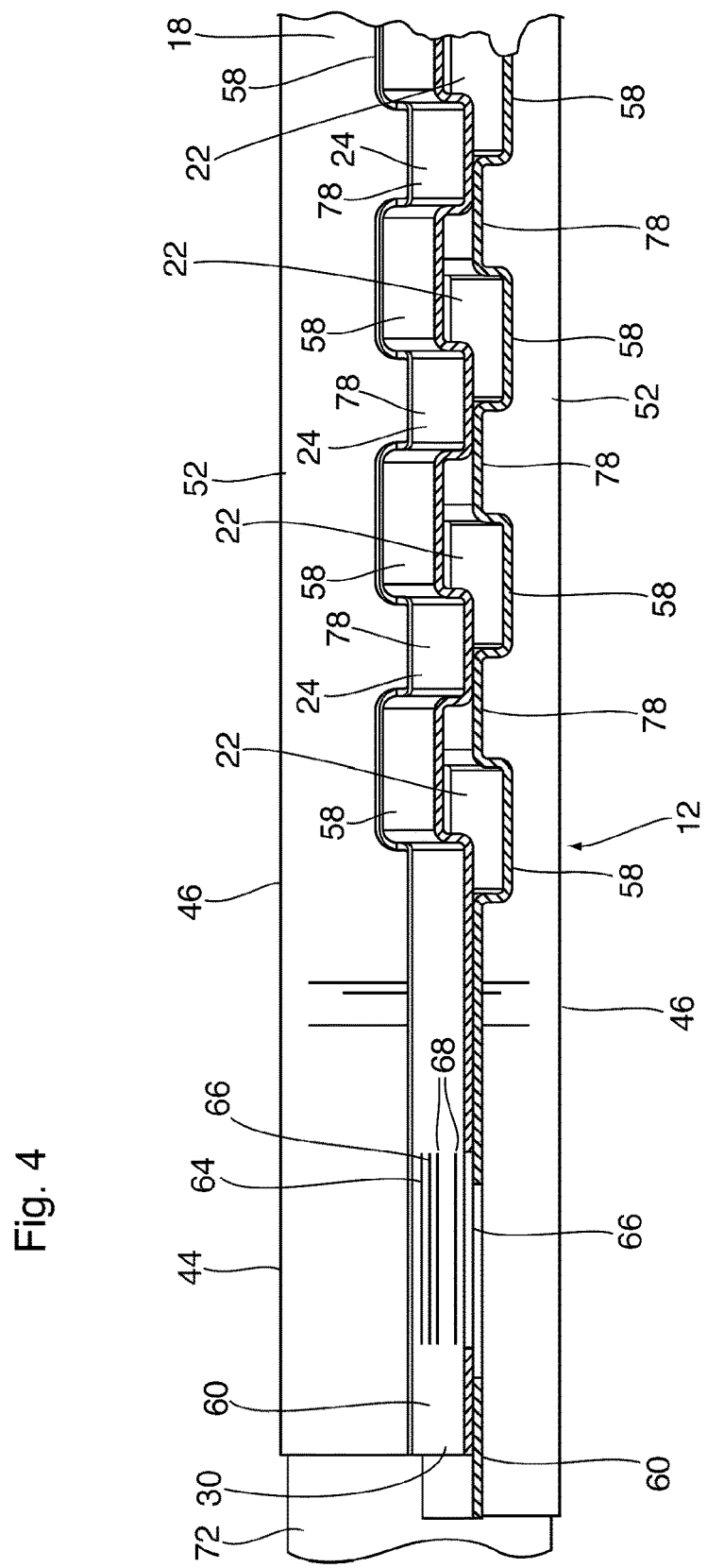
FIG. 4 is an enlarged, partial, axial cross-section through the first panel of the heat exchanger, along line 4-4' of FIG. 2.

The heat exchanger panel 12 has a pair of flat, opposed faces which are traversed by fluid flow passages 22. The passages 22 may have a flattened shape as shown in FIG. 4. This flattened shape of fluid flow passages 22 is advantageous as it maximizes the area of the fluid flow passages 22 which is in engagement with the article to be cooled, such as a battery cell, and helps to minimize thickness of the heat exchanger 10. It will be appreciated that the passages 22 do not necessarily have a flattened shape. Rather, the passages 22 may have a circular cross-section, or any other convenient cross-sectional shape. Although the passages 22 are shown in the drawings as being straight, it will be appreciated that this is not essential. Rather, the passages 22 may be have a non-linear configuration, such as curved, wavy or serpentine shape so as to conform to the profile of the surface of the article being cooled.

As shown in the cross-section of FIG. 4, adjacent fluid flow passages 22 are separated by recessed areas 24 through which no fluid may flow. The fluid flow passages 22 have open ends which are in flow communication with the interiors of the inlet and outlet manifold sections 18, 20.

In the illustrated embodiment, the heat exchanger panel 12 is rectangular or square, having a pair of opposed, axially-extending edge portions 26, 28 in which the inlet and outlet manifold sections 18, 20 are formed, respectively. The heat exchanger panel 12 also has a pair of opposed, transversely-extending edge portions 30, 32. The inlet and outlet manifold sections 18, 20 are parallel to one another and parallel to the longitudinal axis of heat exchanger 10.

As shown in FIG. 1, heat exchanger panels 12, 14, 16 are connected together by a plurality of tubes 34. More specifically, tubes 34 join together the inlet manifold sections 18 of the three exchanger panels 12, 14, 16 so as to form a continuous inlet manifold 36 extending throughout the entire length of heat exchanger 10. Similarly, tubes 34 join together the outlet manifold sections 20 of the three heat exchanger panels 12, 14, 16 so as to form a continuous outlet manifold 38 extending longitudinally throughout the entire length of heat exchanger 10. When connected together, the adjacent heat exchanger panels 12, 14, 16 are spaced apart along the longitudinal axis, being separated by spaces 70. The tubes 34 connecting the inlet manifold sections 18 are sometimes referred to herein as the "inlet manifold tubes", and the tubes 34 connecting the outlet manifold sections 18 are sometimes referred to herein as the "outlet manifold tubes".

In the illustrated embodiment, the heat exchanger 10 includes an inlet opening 40 at one end of the inlet manifold 36, and also includes an outlet opening 42 at one end of the outlet manifold 38. In the illustrated heat exchanger 10, the inlet and outlet openings 40, 42 are both formed at the same end of the first heat exchanger panel 12. The inlet and outlet openings 40, 42 may be provided with respective inlet and outlet fittings 72, 74 to connect the heat exchanger 10 to a coolant circulation system (not shown) which may include a heat exchanger such as a radiator to remove heat from the coolant. Also, the opposite ends of the inlet and outlet manifolds 36, 38 provided in the third heat exchanger, are sealed. For example, the opposite ends of manifolds 36, 38 may be sealed by plugs 76, or they may be crimped shut.

Alternatively, the inlet and outlet openings 40, 42 may be provided at opposite ends of the heat exchanger 10. In this regard, one of the openings 40 or 42 may be provided in heat exchanger panel 12, while the other opening 40 or 42 may be provided in the heat exchanger panel 16 at the opposite end of heat exchanger 10. It will be appreciated that this alternate arrangement may have an impact on the flow distribution of coolant flowing through the fluid flow passages 22 of the panels 12, 14, 16.

The tubes 34 connecting heat exchanger panels 12, 14, 16 are typically of cylindrical shape and are constructed to withstand any forming or support loads that the heat exchanger 10 may encounter in the process of assembling the battery, and in the final application in the vehicle. For example, the tubes 34 may be constructed so as to be bendable, for which purpose they may have a wall thickness which is greater than the thickness of the plate material making up the heat exchanger panels 12, 14, 16. Accordingly, the heat exchanger panels 12, 14, 16 and tubes 34 will typically be separately formed and subsequently connected together to form heat exchanger 10. Furthermore, the formation of discrete heat exchanger panels 12, 14, 16 makes manufacturing easier and less expensive, and permits tighter (or more stringent) dimensional tolerances to be maintained. As used herein, the term "cylindrical" refers to articles such as tubes having a cross-section which is circular, oval, elliptical or of similar shapes.

For the purpose of joining with tubes 34, the open ends of the inlet and outlet manifold sections 18, 20 may be formed as cylindrical sockets 44 which are sized to closely receive the ends of the tubes 34. Such a construction is disclosed in commonly assigned, co-pending U.S. patent application Ser. No. 13/423,385 entitled "Battery Cell Cooler", and published as US 2012/0237805 A1 on Sep. 20, 2012, the contents of which are incorporated herein by reference.

Once the tubes 34 are inserted into sockets 44, the assembly may be brazed or welded so as to form sealed metallurgical connections between the heat exchanger panels 12, 14, 16, thereby providing the brazed or welded assembly shown in FIG. 1. With heat exchanger 10 in the flat condition of FIG. 1, the tubes 34 connecting heat exchanger panels 12, 14, 16 are substantially straight. The provision of integrally formed manifold sections and the connection of panels 12, 14, 16 by metallurgical joints avoids the need for mechanical joints between the panels and manifolds, thereby improving reliability. As used herein, references to "brazing" include other means for forming metallurgical joints, including welding, soldering, etc.

The heat exchanger panels 12, 14, 16 are each formed from a pair of stamped plates 46 which are assembled in face-to-face relation by brazing. In the illustrated embodiment, all of the stamped plates 46 making up the heat exchanger panels 12, 14, 16 are identical, which further simplifies manufacturing. However, it will be appreciated that the plates 46 are not necessarily identical to one another. In another embodiment, the stamped plates 46 making up panels 12, 14, 16 are non-identical mirror images of one another.

Figure 7:
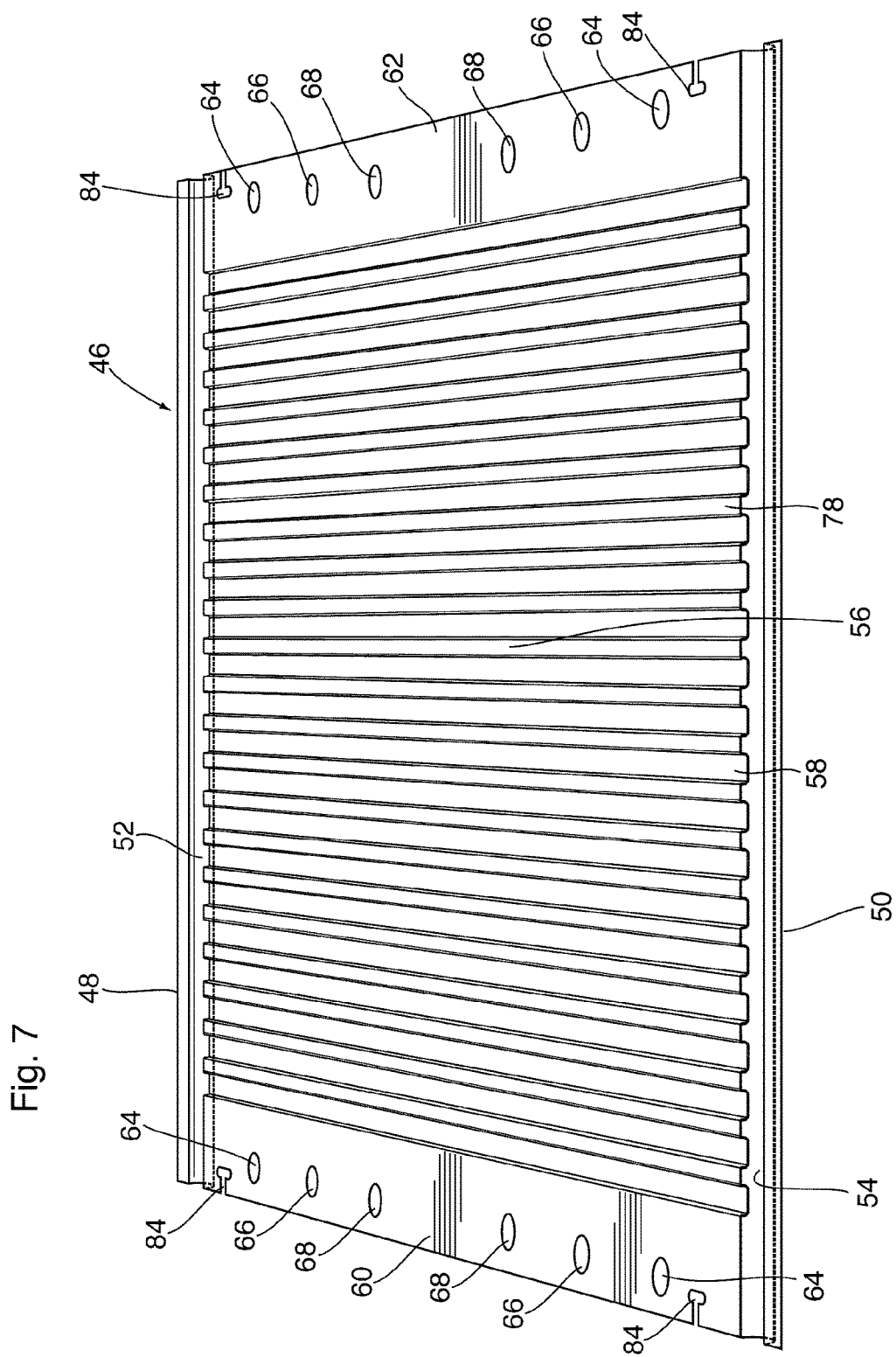
FIG. 7 is a perspective view of a stamped plate of the heat exchanger of FIG. 1.

FIG. 7 illustrates a rectangular, stamped plate 46 of heat exchanger 10 in isolation. The stamped plate 46 has a plurality of open channels which combine with corresponding channels of a second, identical plate 46 to form the inlet manifold section 18, the outlet manifold section 20 and the plurality of fluid flow passages 22.

As shown in FIG. 7, the stamped plate 46 has a pair of opposed, axially-extending edge portions 48, 50 in which open-ended channels 52, 54 are formed. These channels 52, 54 will combine with channels 52, 54 of another plate 46 to form the inlet and outlet manifold sections 18, 20. Furthermore, the stamped plate 46 includes a central portion 56 in which open channels 58 are defined for said fluid flow passages 22. The open channels 58 are in the form of flat-topped ribs separated by flat portions 78 which braze to flat portions 78 in a second stamped plate 46 to form the recessed areas 24 between adjacent fluid flow passages 22.

Due to the simple design of plate 46, material can be pulled from the featureless, axial edge portions 48, 50 of plate 46 during formation of channels 52, 54. This permits the formation of larger channels 52, 54, and consequently the formation of manifolds 36, 38 with larger cross sectional areas. Increasing the cross-sectional area of the manifolds 36, 38 provides lower pressure drop and more even flow distribution of coolant through the fluid flow passages 22 along the length of the heat exchanger 10, and thus allows the heat exchanger 10 and its manifolds 36, 38 to be elongated by adding more heat exchanger panels similar to panels 12, 14, 16, where necessary.

It can be seen from FIG. 3 that the socket 44 is formed to be as close to cylindrical as possible, in order to form a tight fit and reliable seal with the outer surface of tube 34. However, the material of plates 46 at the inner and outer edges of channels 52, 54 will inevitably have a bending radius which results in the formation of small gaps 80, 82 at the respective inboard and outboard edges of the manifold section 18/manifold 36. The size of these gaps 80, 82 should be minimized by minimizing the bending radius at the edges of the channels 52, 54. The gap 82 at the outboard edge can be minimized during formation of plates 46, as discussed above, because material from the outer, free axial edge 48 is pulled into this area. However, this is not possible at the inboard edge due to the presence of the fluid flow passages 22. In order to avoid excessive strain and thinning at the inboard edges of channels 52, 54, a discontinuity such as a hole or slit 84 (see FIGS. 3 and 7) may be provided adjacent to the inboard gap 80, to allow for material to be pulled into the region of gap 80 so as to minimize the size of gap 80 and reduce thinning in this area. As shown in FIG. 7, slits 84 may be formed with circular inner ends to avoid the tendency of cracks to propagate from slits. Although the above discussion of gaps 80, 82 focuses on the sides of plates 52 in which the open channels 52 for inlet manifold section 18 are formed, the same gaps 80, 82 exist at the other side of plate 46, in which the open channels 54 for outlet manifold section 20 are formed, and the above discussion applies equally to the outlet manifold sides of plates 46.

The stamped plate 46 also includes a pair of opposed, transversely extending edge portions 60, 62, the features of which will be discussed below.

When two stamped plates 46 are brought together in face-to-face relation, the plates 46 will be aligned with one another in the transverse direction as precisely as possible, within acceptable tolerances, such that the open channels 52 will combine to form inlet manifold section 18, and the open channels 54 will combine to form outlet manifold section 20. The stamped plates 46 may be assembled in a braze fixture (not shown) to ensure the desired transverse alignment, or the stamped plates 46 may first be assembled in an assembly fixture and then placed into a simplified braze fixture.

Figure 6:
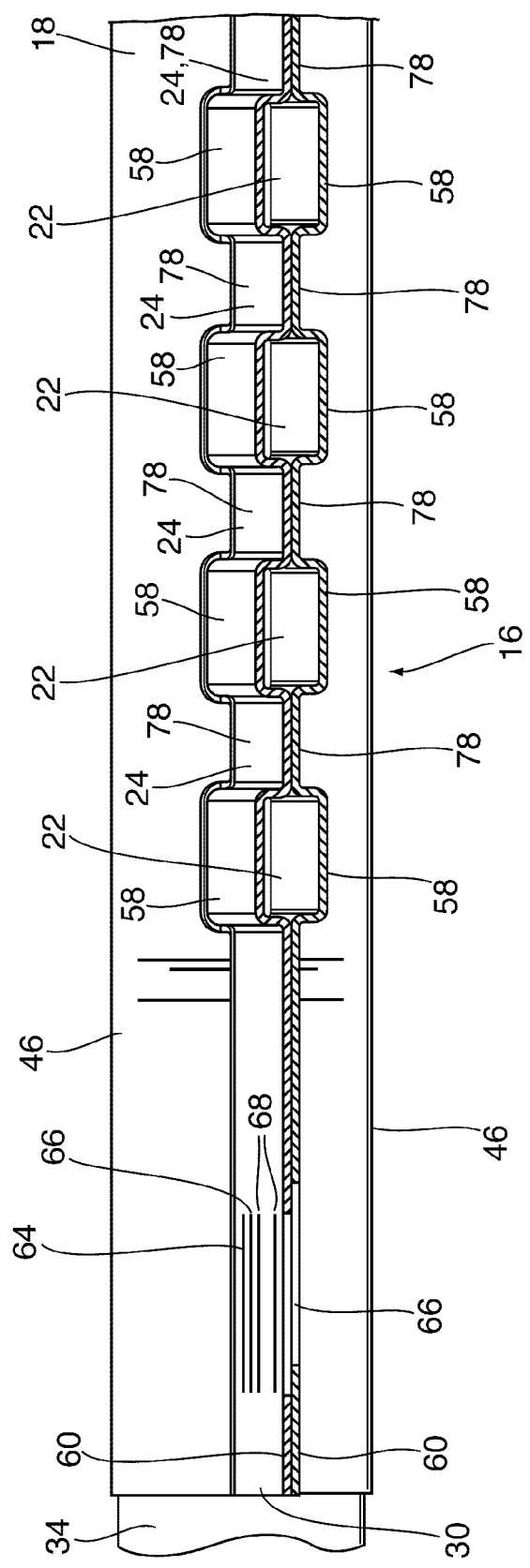
FIG. 6 is an enlarged, partial, axial cross-section through the third panel of the heat exchanger, along line 6-6' of FIG. 2.

It can be seen from the cross-section of FIG. 6 that precise axial alignment of a pair of stamped plates 46, within acceptable tolerances, will result in substantial axial alignment of the open channels 58 in the stamped plates 46 to form fluid flow passages 22 in which the transversely-extending edges of the open channels are in substantially opposed alignment. In other words, in FIG. 6 there is substantially no axial offset of the open channels 58 relative to one another. This precise alignment without offset will provide the fluid flow passages 22 with maximum cross-sectional area and/or largest hydraulic diameter, and will maximize fluid flow through the fluid flow passages 22.

Due at least in part to the relatively small diameter of the integrally formed inlet and outlet manifolds 36, 38, it will be appreciated that the flow distribution of coolant through the heat exchanger panels will not be uniform. In this regard, the flow rate of fluid through heat exchanger 10 will decrease with increasing distance from the inlet and outlet openings 40, 42. Conversely, the flow rate will be highest in those regions which are closest to the inlet and outlet openings 40, 42. Therefore it can be seen that the locations of the inlet and outlet openings 40, 42 will determine the regions of heat exchanger 10 that will experience higher or lower flow rates. In the illustrated embodiment, where the inlet and outlet openings 40, 42 are both provided in the first heat exchanger panel 12, there will tend to be a higher coolant flow rate through the first heat exchanger panel 12 than through the third heat exchanger panel 16, and the flow rate through the second heat exchanger panel 14 will be intermediate between the flow rates through the first and third heat exchanger panels 12, 16.

Embodiments in which the inlet and outlet openings 40, 42 are located at opposite ends of the heat exchanger will exhibit a different flow distribution, with the highest flow rates being in the heat exchanger panels where the inlet and outlet openings 40, 42 are located. In such an embodiment, it may be desired to restrict the flow through both end panels, while maintaining maximum cross-sectional area and/or hydraulic diameter in the middle panel(s).

In order to provide substantially balanced flow distribution throughout all three heat exchanger panels 12, 14, 16, it may be desirable to restrict the flow through the second heat exchanger panel 14 relative to the third heat exchanger panel 16, and also to restrict the flow through the first heat exchanger panel 12 relative to the second heat exchanger panel 14.

The present embodiment provides variable flow restriction in the heat exchanger panels while maintaining the benefits of constructing the heat exchanger panels 12, 14, 16 from identical stamped plates 46. This is accomplished by intentionally introducing axial offset or misalignment of identical stamped plates 46 during assembly, to adjust the hydraulic diameter and/or cross-sectional areas of the fluid flow passages in the heat exchanger panels 12, 14, 16. For example, the stamped plates 46 in the third heat exchanger panel 16 may be in substantial axial alignment as described above, the stamped plates 46 in the second heat exchanger panel 14 may be assembled with a first amount of offset or axial misalignment, and the stamped plates 46 in the first heat exchanger panel 12 may be assembled with a second amount of offset or axial misalignment, which is greater than the first amount of axial misalignment. In this way, the flow restriction through the first heat exchanger panel 12 is greater than the flow restriction through the second heat exchanger panel 14, and the flow restriction through the second heat exchanger panel 14 is greater than the flow restriction through the third heat exchanger panel 16. By selecting the amount of offset or axial misalignment, it is possible to achieve a substantially uniform flow distribution in each of the heat exchanger panels 12, 14, 16 making up heat exchanger 10.

The variable axial misalignment of the stamped plates along the longitudinal axis is provided during assembly of the heat exchanger panels 12, 14, 16. For example, each of the stamped plates 46 may be provided with a plurality of indexing holes in their transverse edge portions 60, 62. In the illustrated embodiment, each stamped plate 46 is provided with twelve indexing holes, with six holes being provided in each of the transverse edge portions 60, 62. This arrangement permits the identical plates 46 to be flipped over or flipped and rotated by 180 degrees so as to bring them into face-to-face relation for assembly, while providing three different degrees of alignment or offset. It will be appreciated that this arrangement where the plates can be brought into alignment by flipping, with or without rotation, ensures proper assembly of plates 46, but may require plates 46 to have an axis of symmetry along the axial direction. In embodiments where rotational alignment of the plates is either not desired or not needed, such that the plates are brought into alignment only by flipping them over, it will be appreciated that the axially symmetrical pattern of indexing holes on stamped plates 46 is unnecessary, and it may be desired to reduce the number of indexing holes in the plates. For example, the number of indexing holes could be reduced to six, two holes for each degree of alignment.

Although one arrangement is shown in the drawings, it will be appreciated that there are numerous other ways to provide axial alignment/offset between plates 46, and that these alternate arrangements may require different plate configurations. The specific plate configurations will depend partly on the number of degrees of alignment/offset required, and the amount of space available for holes or other indexing features. For example, the plates 46 may include indexing features other than indexing holes, such as notches in the edges of the plates. Also, it will be appreciated that the indexing features may be provided in the axial edge portions 48, 50 of plates 46, in addition to or instead of being provided in the transverse edge portions 60, 62. Also, the number of holes can be reduced where the plates 46 are not required to be symmetrical along the axial direction, or where an assembly fixture registers with specific features of the plates and produces the alignment/offset. For example, an assembly fixture may include an edge locator such that the transverse edges of plates 46 are used to provide alignment/offset.

To achieve the required three degrees of axial alignment in heat exchanger 10, three sets of indexing holes are provided, each set consisting of four holes, with two holes in each of the transverse edge portions 60, 62. Referring to FIG. 7, each stamped plate 46 has a first set of indexing holes 64, a second set of indexing holes 66, and a third set of indexing holes 68.

Each set of indexing holes will produce a specific axial alignment of the two stamped plates 46 during assembly of the heat exchanger panels 12, 14, 16. In this regard, with the first set of indexing holes 64 in alignment with one another, the stamped plates 46 will be axially aligned within acceptable tolerances, resulting in the configuration shown in FIG. 6 having maximum flow and minimum pressure drop through passages 22.

Figure 5:
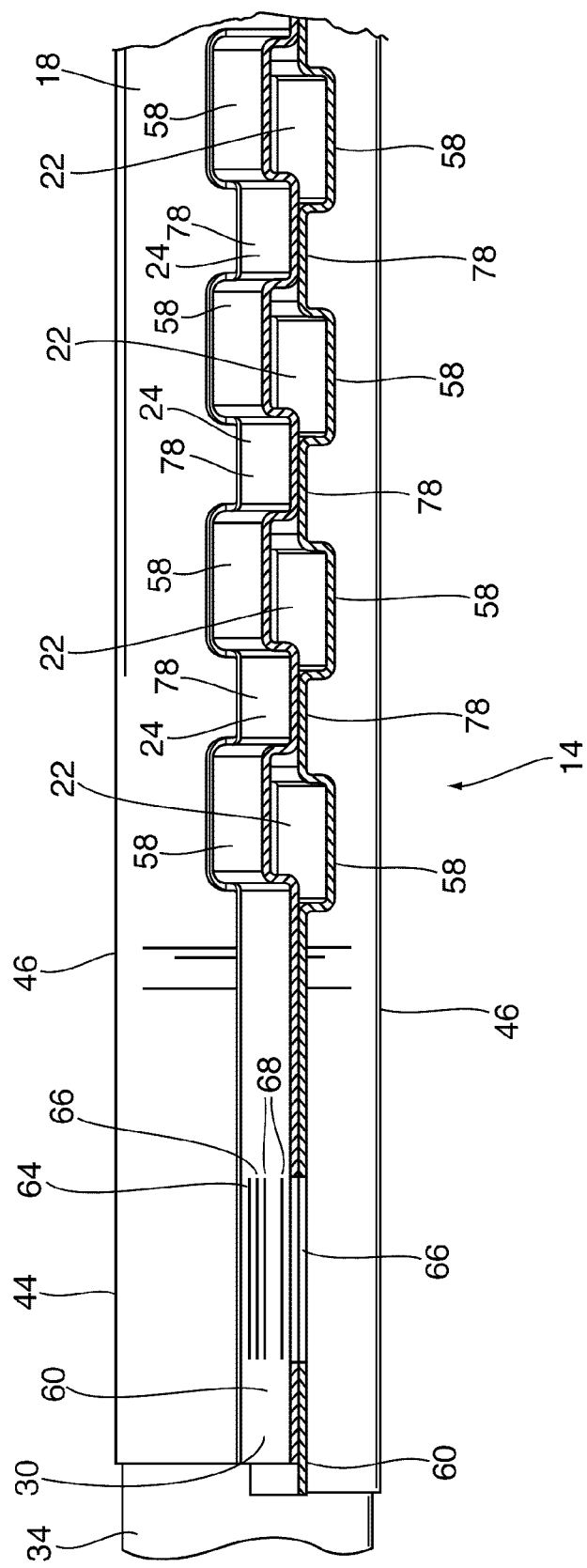
FIG. 5 is an enlarged, partial, axial cross-section through the second panel of the heat exchanger, along line 5-5' of FIG. 2.

Similarly, when the holes 66 of the second set are aligned with one another, there will be a first amount of offset in the plates 46 as in the second heat exchanger panel 14 shown in FIG. 5.

Lastly, when the holes 68 of the third set are aligned with one another, there will be a second amount of offset in the plates 46 as in the first heat exchanger panel 12 shown in FIG. 4, the second amount of offset being greater than the first amount of offset.

Accordingly, it can be seen that the provision of multiple sets of indexing holes in the transverse edge portions 60, 62 of the stamped plates 46 permits the degree of alignment and/or misalignment to be controlled.

During assembly of the heat exchanger panels 12, 14, 16, the plates 46 are placed in assembly or brazing fixtures (not shown) having pins which will be received in the indexing holes. In this regard, a first fixture will have a set of pins which are arranged to be received in the first set of holes 64, a second fixture will have a set of pins which are arranged to be received in the second set of holes 66, and a third fixture will have an arrangement of which are arranged to be received in the third set of holes 68. In the illustrated embodiment each fixture will have four pins. However, as mentioned above, the number of holes for each alignment position can be reduced to two, in which case each fixture will have only two pins. In this way, heat exchanger panels of variable offset can be manufactured from identical plates 46.

There are various ways in which the heat exchanger 10 may be assembled. In one embodiment, the parts may be assembled in an assembly/brazing fixture on the (moving) belt of a braze furnace by the following sequence of steps: insert the lower plate 46 of panel 12 into the fixture; place inlet and outlet fittings 40, 42 into the ends of open channels 52, 54; insert the lower plate 46 of panel 14 into the fixture, in spaced, side-by-side relation relative to the bottom plate 46 of panel 12; place a pair tubes 34 into the channels 52, 54 of the two side-by-side bottom plates 46; place the top plate 46 of panel 12 over the corresponding bottom plate; repeat above steps until assembly is complete; and then braze the parts together in the braze furnace. It will be appreciated that the portions of the fixture in which the panels 12, 14, 16 are assembled will include pins which will be received in the indexing holes to produce the desired degree of offset.

In another embodiment, the parts may be assembled in an assembly fixture by the same assembly steps as discussed above, and then compressed and mechanically locked together. The assembled structure is then removed from the assembly fixture and placed in a simplified brazing fixture to be brazed in a furnace.

In another embodiment, the plates 46 are first brazed together to form the discrete panels 12, 14, 16. The panels 12, 14, 16 are then placed in an assembly/brazing fixture and combined with the tubes 34, inlet and outlet fittings 72, 74 and plugs 76. This assembly is then subjected to a secondary brazing/welding/joining process, such that the panels 12, 14, 16 are joined together to produce heat exchanger 10. The assembly/brazing fixture for each panel 12, 14, 16 may have features, such as pins which align with the indexing holes of panels 12, 14, 16, and ensure that the panels are located in the correct positions.

It will be appreciated that the number of indexing holes provided in the plates 46 can be varied according to the number of heat exchanger panels to be assembled into the heat exchanger. It will also be appreciated that more or fewer than four indexing holes may be provided in each set of holes. For example, as discussed above, each set of holes may comprise two holes.

Although the illustrated embodiment uses misalignment or offset to provide balanced flow, it will be appreciated that other methods can be used to perform this flow balancing. For example, flow balancing can be achieved by providing flow obstructions in at least one of the fluid flow passages 22, in the inlet manifold section 18, and/or in the outlet manifold section 20 of at least one of the sections 12, 14, 16. Furthermore, flow obstructions may be provided in one or more of the tubes 34 connecting adjacent sections 12, 14, 16.

Figure 8:
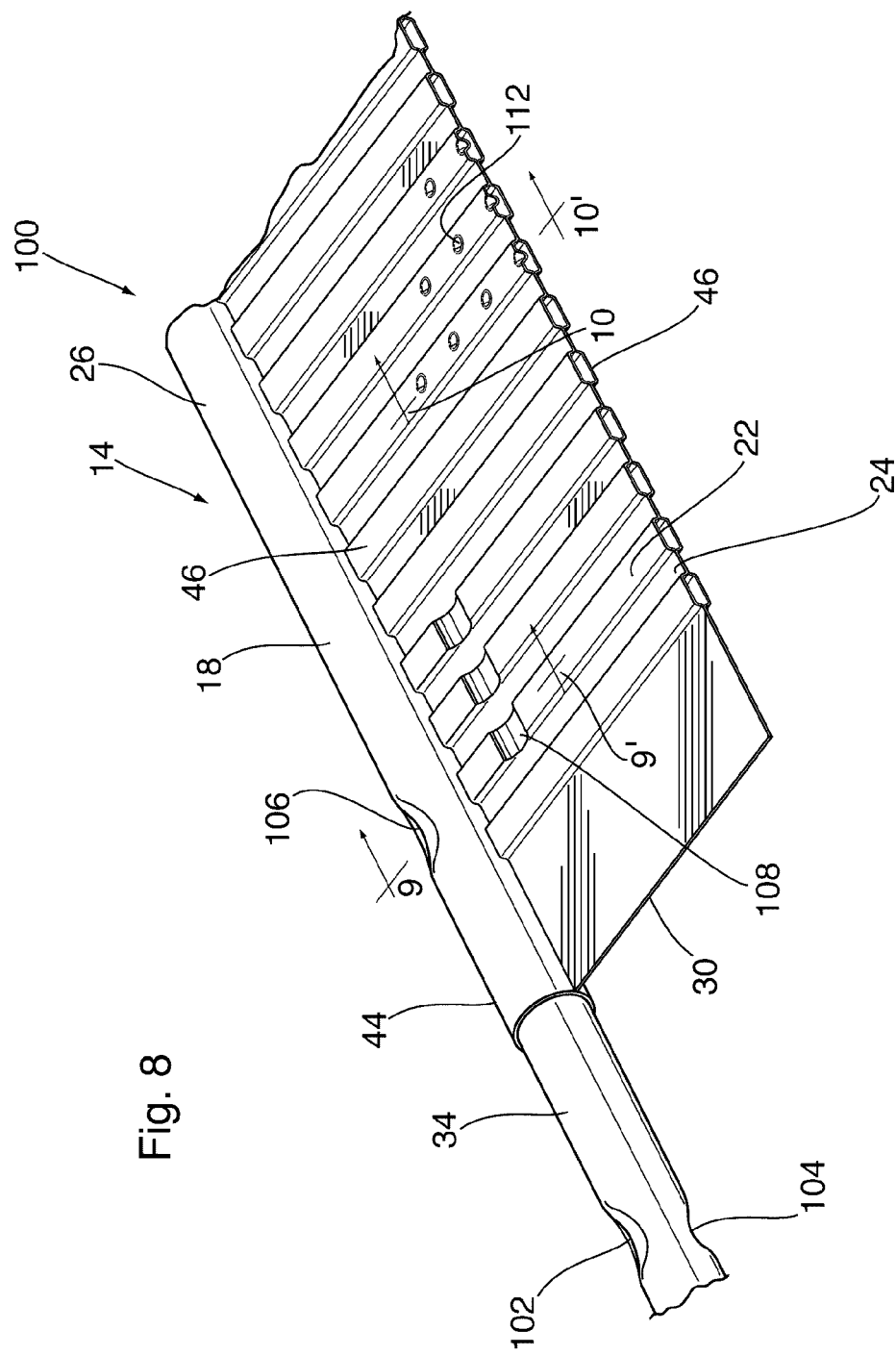
FIG. 8 is an axial (longitudinal) cross-section through a panel of a heat exchanger according to another embodiment.
Figure 9:
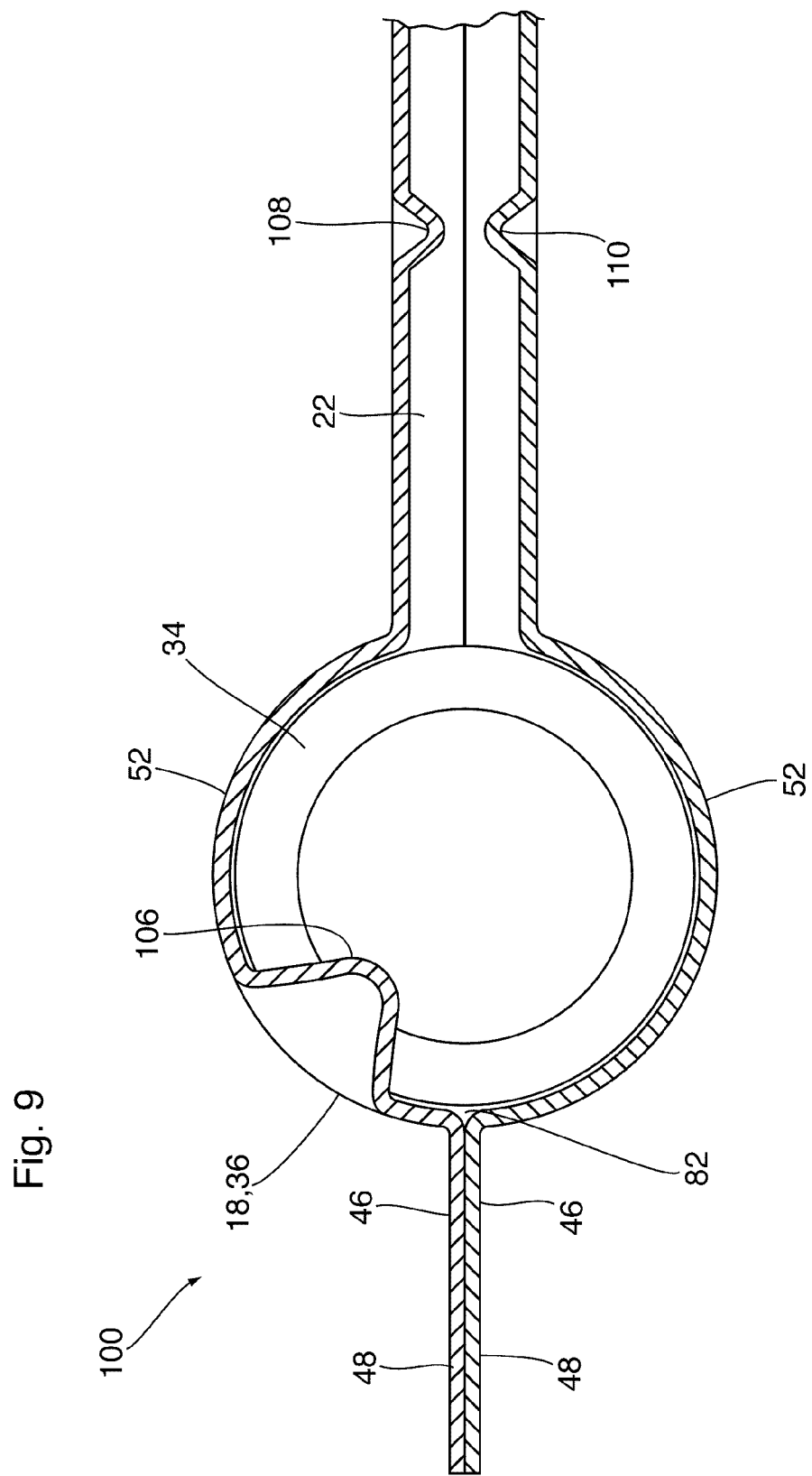
FIG. 9 is an enlarged, partial, axial cross-section along line 9-9' of FIG. 8.
Figure 10:
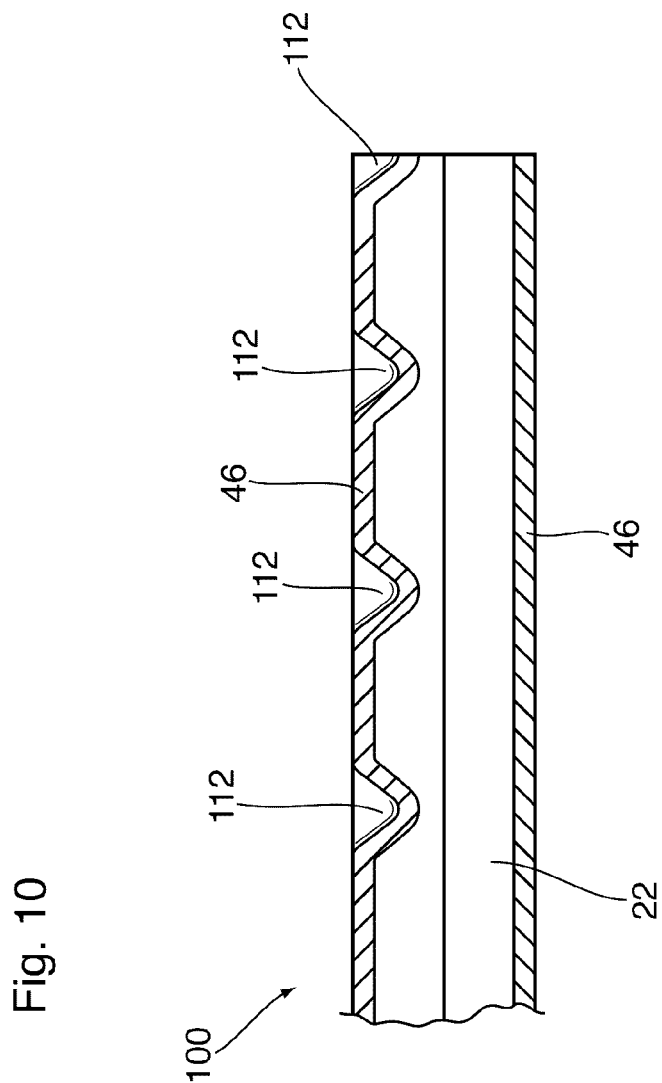
FIG. 10 is an enlarged, partial, axial cross-section along line 10-10' of FIG. 8.

FIGS. 8-10 shows a heat exchanger 100 according to a second embodiment. Heat exchanger 100 has a number of elements which are similar or identical to elements of heat exchanger 10. Like elements of heat exchangers 10 and 100 are therefore described with like reference numerals, and the above descriptions of these elements in heat exchanger 10 also apply to heat exchanger 100, unless otherwise indicated below.

Although heat exchanger 100 comprises a plurality of heat exchanger sections connected together by tubes 34, only a portion of one section 14 is shown in FIGS. 8 to 10. For the purpose of illustration, heat exchanger 100 is shown as having four different types of flow obstructions. However, it will be appreciated that heat exchanger 100 may include any one or more of the flow obstructions shown in FIGS. 8 to 10. These flow obstructions may be used instead of, or in combination with, the misalignment or offset described above in order to provide balanced flow throughout the heat exchanger 100.

FIG. 8 incudes a pair of flow obstructions in the tube 34 connecting the heat exchanger section 14 to another section (not shown). In the illustrated embodiment, these flow obstructions comprise an opposed pair of depressions 102, 104 which reduce the cross-sectional area of the tube 34, partially restricting flow therethrough. The depressions 102, 104 may be in the form of ribs, dimples or crimps, and may be produced by placing the tube 34 in or on a die and striking its opposite side with a punch, for example, either before or after assembly of the heat exchanger 100. Although two opposed depressions 102, 104 are shown, it will be appreciated that the tube 34 may be provided with only one depression 102 or 104. Also, it will be appreciated that the depressions 102, 104 may be of different size and/or shape, and are not necessarily opposite to one another, and/or may be longitudinally spaced from one another. Also, depressions 102 and/or 104 may be formed at any point in the circumference of the tube 34. This type of flow obstruction may be particularly useful where the inlet and outlet for the coolant are located at the same end of the heat exchanger, as in heat exchanger 10 described above.

FIGS. 8 and 9 also show a second type of flow obstruction, comprising a depression 106 provided in the inlet manifold section 18. As shown in FIG. 9, the depression 106 reduces the cross-sectional area of the inlet manifold section 18, partially restricting flow therethrough. The depression 106 may be in the form of a rib, dimple or crimp and may be produced by striking the inlet manifold section 18 with a tool. In this embodiment, the depression 106 is provided in the open channel 52 of the top plate 46 (shown in FIG. 9), and may be formed either before or after two plates 46 are joined to form the second heat exchanger section 14. Although only a single depression 106 is provided in the inlet manifold section 18, it will be appreciated that the inlet manifold section 18 may be provided with a plurality of depressions 106, which may be of the same or different size and/or shape, may be opposite to one another or may be longitudinally spaced from one another along the length of the inlet manifold section. Also, as shown in FIG. 9, the centre of the depression 106 is at about 45 degrees from the horizontal, although it will be appreciated that the location of the depression 106 about the circumference of inlet manifold section 108 is variable. Also, although the depression 106 is shown as being provided in the inlet manifold section 18, one or more similar depressions 106 may be provided in the outlet manifold section 20 (not shown in FIG. 8). This type of flow obstruction may also be particularly useful where the inlet and outlet for the coolant are located at the same end of the heat exchanger, as in heat exchanger 10 described above.

FIGS. 8 and 9 also show a third type of flow obstruction, comprising a plurality of depressions 108 and 110 formed in the individual fluid flow channels 22. As shown in the partial sectional view of FIG. 9, the fluid flow channels 22 are provided with an opposed pair of depressions 108, 110 which reduce the cross-sectional area of the fluid flow channel 22, partially restricting flow therethrough. FIG. 8 shows only three of the fluid flow channels 22 being provided with these depressions, however, it will be appreciated that the depressions 108, 110 will typically be provided in all the fluid flow channels 22 of section 14. It will also be appreciated that neighbouring heat exchanger sections 12 and/or 16 may also be provided with similar depressions 108, 110, although the amount of flow restriction produced by the depressions 108, 110 in other sections 12, 16 do not necessarily provide the same flow restriction as the depressions 108, 110 in section 14, thus providing the ability to balance flow throughout heat exchanger 100. This type of flow obstruction is useful for various inlet/outlet configurations, and can be used where the coolant inlet and outlet are located at the same end or at opposite ends of the heat exchanger.

Depressions 108, 110 may be in the form of ribs, dimples or crimps and may be produced by placing section 14 in or on a die and striking its opposite side with a punch, for example, either before or after assembly of the section 14. In the illustrated embodiment, the depressions 108, 110 are in the form of a longitudinally extending ribs or troughs. Although two opposed depressions 108, 110 are shown, it will be appreciated that each channel 22 may be provided with only one depression 108 or 110. Also, it will be appreciated that the depressions 108, 110 may be of different size and/or shape, and are not necessarily opposite to one another, but rather may be transversely spaced from one another.

FIGS. 8 and 10 also show a fourth type of flow obstruction, comprising a plurality of depressions 112 formed in the individual fluid flow channels 22. As shown in the partial sectional view of FIG. 10, the fluid flow channels 22 are provided with a plurality of transversely spaced depressions 112 in the top wall of channel 22, partially restricting flow therethrough. FIGS. 8 and 9 show only three of the fluid flow channels 22 being provided with these depressions 112. However, it will be appreciated that the depressions 112 may typically be provided in all the fluid flow channels 22 of section 14.

Depressions 112 are in the form of dimples produced by striking the section 14 with a tool, either before or after assembly of the section 14. Although depressions 112 are formed only in the top wall of channel 22, it will be appreciated that each channel 22 may be provided with only depressions 112 in the top and/or bottom wall of channel 22. It will be appreciated that the depressions 112 may be of different size and/or shape.

FIG. 8 shows that the channels 22 of section 14 may be provided with different numbers of depressions 112, thereby providing different amounts of flow obstruction in the fluid flow channels 22 of section 14. In this regard, the number of depressions 112 decreases in the direction of fluid flow (to the right in FIG. 8), thereby providing a lesser amount of flow restriction. It will be appreciated that each fluid flow channel 22 may instead be provided with the same number of depressions 112, and/or the number of depressions 112 in the channels 22 of adjacent heat exchanger sections 12 and 16 may be the same as or different. This type of flow obstruction is also useful for various inlet/outlet configurations, and can be used where the coolant inlet and outlet are located at the same end or at opposite ends of the heat exchanger.

According to an embodiment, the flow obstructions described above may be provided instead of, or in combination with, the misalignment or offset described above. For example, all three heat exchanger panels 12, 14, 16 can be assembled with substantially complete alignment, such that all the fluid flow passages 22 initially have maximum cross-sectional area/hydraulic diameter as in FIG. 6. The passages 22 in the first and second panels 12, 14 can then be struck by tooling to restrict the passages 22 and reduce their cross-sectional area/hydraulic diameter, with the degree of restriction being greater in the first panel 12 than in the second panel 14. Thus, it is possible to provide flow balancing in panels 12, 14, 16 without providing the plates with indexing features.

Also, it will be appreciated that the depressions in the heat exchanger sections 12, 14 and 16 may have many different forms, and may be formed in numerous different ways. For example, as stated above, the passages 22 may be struck by tooling after the panels 12, 14, and/or 16 are assembled, either before or after brazing, so as to bring about the required degree of deformation to restrict at least some of the passages 22. Alternatively, the plates 46 themselves may be struck by tooling before being assembled to form panels 12, 14 and/or 16, either during or after the stamping of the open channels 52, 54, 58. The deformation may take a variety of forms, including ribs which may extend across or along the passages 22 and/or the channels 58 from which they are formed, and locally reduce the depth of channel(s) 58 and/or the cross-sectional area of the passage(s) 22 in which they are provided. Alternatively, the deformation may take the form of discrete bumps or dimples which locally reduce the depth of channel(s) 58 and/or the cross-sectional area of the passage(s) 22 in which they are provided. It will be appreciated that ribs or dimples in mating pairs of plates 46 may either align or not align with one another. Where the ribs or dimples of mating plates 46 align with one another, they may produce a local flow restriction which is greater than a flow restriction which is produced where the ribs or dimples do not align. Thus, it is possible to provide an arrangement of ribs and/or dimples which are formed in the plates 46 before assembly of panels 12, 14 and/or 16, the ribs and/or dimples being located such that the ribs and/or dimples in one plate 46 align with those in a mating plate 46 when the plates 46 are flipped over to bring them into position for assembly; and such that the ribs and/or dimples do not align when the plates 46 are flipped and rotated to bring them into position for assembly. It will be appreciated that alignment of the ribs and/or dimples in opposed plates 46 may bring them into contact with one another during assembly, such that they produce an obstruction extending throughout the entire height of the fluid flow passage(s) 22.

Although the invention has been described in connection with certain embodiments, it is not restricted thereto. Rather, the invention includes all embodiments which may fall within the scope of the following claims.

What is claimed is:

1. A heat exchanger, comprising:
   (a) a plurality of discrete heat exchanger panels, each of the heat exchanger panels having an inlet manifold section, an outlet manifold section, and a plurality of fluid flow passages extending between the inlet and outlet manifolds;
   (b) at least one inlet manifold tube, wherein each said inlet manifold tube connects the inlet manifold sections of an adjacent pair of said discrete heat exchanger panels, wherein an inlet manifold of the heat exchanger comprises the inlet manifold sections of the discrete heat exchanger panels and the at least one inlet manifold tube;
   (c) at least one outlet manifold tube, wherein each said outlet manifold tube connects the outlet manifold sections of an adjacent pair of said discrete heat exchanger panels, wherein an outlet manifold of the heat exchanger comprises the outlet manifold sections of the discrete heat exchanger panels and the at least one outlet manifold tube;
   (d) an inlet opening provided in said inlet manifold; and
   (e) an outlet opening provided in said outlet manifold;
   wherein the heat exchanger has a longitudinal axis, and wherein the inlet manifold and the outlet manifold are parallel to the longitudinal axis;
   wherein each of the discrete heat exchanger panels comprises a pair of stamped plates, each having a plurality of open channels, wherein the plates are joined together face-to-face to define said inlet manifold section, said outlet manifold section, and said plurality of fluid flow passages;
   wherein the plurality of discrete heat exchanger panels includes a first heat exchanger panel and a second heat exchanger panel;
   wherein each of the stamped plates has a pair of opposed, axially-extending edge portions in which open channels are defined for said inlet and outlet manifold sections, a central portion in which open channels are defined for said fluid flow passages, and a pair of opposed, transversely-extending edge portions;
   wherein at least one of the transversely-extending edge portions and/or at least one of the axially extending edge portions of each of the stamped plates is provided with one or more indexing features which provide different degrees of axial alignment of the stamped plates in the first heat exchanger panel relative to the second heat exchanger panel; and
   wherein said different degrees of axial alignment provide the fluid flow passages of the second heat exchanger section with a greater cross-sectional area or hydraulic diameter than the fluid flow passages of the first heat exchanger section.

2. The heat exchanger according to claim 1, wherein the stamped plates are identical.

3. The heat exchanger according to claim 1, wherein the inlet and outlet manifold sections of the discrete heat exchanger panels are parallel to one another and each have a pair of open ends.

4. The heat exchanger according to claim 3, wherein the fluid flow passages are substantially perpendicular to the inlet and outlet manifold sections.

5. The heat exchanger according to claim 1, wherein the discrete heat exchanger panels each have a pair of flat, opposed faces which are traversed by said fluid flow passages.

6. The heat exchanger according to claim 1, wherein the transversely-extending edge portions of adjacent pairs of said discrete heat exchanger panels are axially spaced apart.

7. The heat exchanger according to claim 1, wherein the inlet and outlet openings are provided at the same end of the heat exchanger.

8. The heat exchanger according to claim 1, wherein the inlet and outlet openings are provided at opposite ends of the heat exchanger.

9. The heat exchanger according to claim 1, wherein the indexing features are provided in each of the stamped plates and comprise at least a first set of indexing holes and a second set of indexing holes provided in the transversely-extending edge portions of the stamped plates; and wherein alignment of the first set of said indexing holes in the first stamped plate with the first set of said indexing holes in the second stamped plate results in substantially complete axial alignment of the plates, such that there is substantially no offset of the open channels for the fluid flow passages in the first stamped plate relative to the open channels for the fluid flow passages in the second stamped plate;

alignment of the second set of said indexing holes in the first stamped plate with the second set of said indexing holes in the second stamped plate results in axial misalignment of the plates, such that there is a partial offset of the open channels for the fluid flow passages in the first stamped plate relative to the open channels for the fluid flow passages in the second stamped plate.

10. The heat exchanger according to claim 9, wherein the first and second stamped plates include a third set of said indexing holes, wherein:

alignment of the third set of said indexing holes in the first stamped plate with the third set of said indexing holes in the second stamped plate results in axial misalignment of the plates, such that there is a partial offset of the open channels for the fluid flow passages in the first stamped plate relative to the open channels for the fluid flow passages in the second stamped plate; and wherein the partial offset produced by alignment of the third sets of indexing holes produces a partial offset which is different from the partial offset produced by alignment of the second sets of indexing holes.

11. The heat exchanger according to claim 9, wherein each said set of indexing holes includes at least one indexing hole in each of the transversely-extending edge portions of each of the stamped plates.

12. The heat exchanger according to claim 1, wherein the first and second stamped plates each have an axial axis of symmetry.

13. A heat exchanger, comprising:
(a) a plurality of discrete heat exchanger panels, each of the heat exchanger panels having an inlet manifold section, an outlet manifold section, and a plurality of fluid flow passages extending between the inlet and outlet manifolds;
(b) at least one inlet manifold tube, wherein each said inlet manifold tube connects the inlet manifold sections of an adjacent pair of said discrete heat exchanger panels, wherein an inlet manifold of the heat exchanger comprises the inlet manifold sections of the discrete heat exchanger panels and the at least one inlet manifold tube;
(c) at least one outlet manifold tube, wherein each said outlet manifold tube connects the outlet manifold sections of an adjacent pair of said discrete heat exchanger panels, wherein an outlet manifold of the heat exchanger comprises the outlet manifold sections of the discrete heat exchanger panels and the at least one outlet manifold tube;
(d) an inlet opening provided in said inlet manifold; and
(e) an outlet opening provided in said outlet manifold;
wherein the heat exchanger has a longitudinal axis, and wherein the inlet manifold and the outlet manifold are parallel to the longitudinal axis;
wherein each of the discrete heat exchanger panels comprises a pair of stamped plates, each having a plurality of open channels, wherein the plates are joined together face-to-face to define said inlet manifold section, said outlet manifold section, and said plurality of fluid flow passages;
wherein the plurality of discrete heat exchanger panels includes a first heat exchanger panel and a second heat exchanger panel;
wherein each of the stamped plates has a pair of opposed, axially-extending edge portions in which open channels are defined for said inlet and outlet manifold sections, a central portion in which open channels are defined for said fluid flow passages, and a pair of opposed, transversely-extending edge portions;
wherein the inlet and outlet manifold sections each have open ends, and wherein each of the open ends is cylindrical and is sized to receive one end of one of the tubes, wherein a sealed connection is provided between said open end and said one end of said tube;
wherein the at least one inlet manifold tube and the at least one outlet manifold tube are cylindrical; and
wherein the at least one inlet manifold tube and the at least one outlet manifold tube each have a wall thickness which is greater than a thickness of material from which the panels are formed.

14. The heat exchanger according to claim 13, wherein the at least one inlet manifold tube and the at least one outlet manifold tube are bendable.

15. The heat exchanger according to claim 13, wherein the sealed connection is a brazed connection.

16. The heat exchanger according to claim 13, wherein one or more flow restrictions are provided in at least the first heat exchanger panel, said one or more flow restrictions producing a reduced cross-sectional area and/or hydraulic diameter in the first heat exchanger panel.

17. The heat exchanger according to claim 16, wherein said one or more flow restrictions of the first heat exchanger panel are provided in at least some of the fluid flow passages, the inlet manifold section, and/or the outlet manifold section.

18. The heat exchanger according to claim 17, wherein each said flow restriction is in the form of a depression.

19. The heat exchanger according to claim 18, wherein each said depression is in the form of a crimp, a dimple, or a rib.

20. The heat exchanger according to claim 18, wherein the number and/or size of the depressions is varied in different fluid flow passages of the first heat exchanger panel, so as to provide different flow restrictions in two or more of the fluid flow passages of the first heat exchanger panel.

21. The heat exchanger according to claim 16, wherein said one or more flow restrictions of the first heat exchanger panel are provided in the at least one inlet manifold tube and/or the at least one outlet manifold tube.

22. The heat exchanger according to claim 16, wherein the second heat exchanger panel is adjacent to the first heat exchanger panel, wherein the first heat exchanger panel is proximal to at least one of the inlet opening and the outlet opening, and the second heat exchanger is distal to at least one of the inlet opening and the outlet opening.

23. The heat exchanger according to claim 22, wherein the second heat exchanger panel is free of said flow restrictions.

24. The heat exchanger according to claim 22, wherein the second heat exchanger panel is provided with one or more flow restrictions, and wherein the cross-sectional area and/or the hydraulic diameter in the second heat exchanger panel is greater than that in the first heat exchanger panel.

* * * * *